US010454137B2

(12) United States Patent
Lim et al.

(10) Patent No.: US 10,454,137 B2
(45) Date of Patent: Oct. 22, 2019

(54) NON-AQUEOUS ELECTROLYTE SOLUTION AND LITHIUM SECONDARY BATTERY COMPRISING THE SAME

(71) Applicant: LG Chem, Ltd., Seoul (KR)

(72) Inventors: Young Min Lim, Daejeon (KR); Chul Haeng Lee, Daejeon (KR)

(73) Assignee: LG Chem, Ltd. (KR)

( * ) Notice: Subject to any disclaimer, the term of this patent is extended or adjusted under 35 U.S.C. 154(b) by 315 days.

(21) Appl. No.: 15/513,313

(22) PCT Filed: Sep. 24, 2015

(86) PCT No.: PCT/KR2015/010133
§ 371 (c)(1),
(2) Date: Mar. 22, 2017

(87) PCT Pub. No.: WO2016/048078
PCT Pub. Date: Mar. 31, 2016

(65) Prior Publication Data
US 2017/0309960 A1 Oct. 26, 2017

(30) Foreign Application Priority Data

Sep. 26, 2014 (KR) .................. 10-2014-0128884
Sep. 24, 2015 (KR) .................. 10-2015-0135261

(51) Int. Cl.
H01M 10/0567 (2010.01)
H01M 10/0525 (2010.01)
H01M 10/0568 (2010.01)
H01M 10/0569 (2010.01)

(52) U.S. Cl.
CPC ... H01M 10/0567 (2013.01); H01M 10/0525 (2013.01); H01M 10/0568 (2013.01); H01M 10/0569 (2013.01); H01M 2300/0025 (2013.01)

(58) Field of Classification Search
CPC ......... H01M 10/0567; H01M 10/0569; H01M 10/0525; H01M 10/0568; H01M 2300/0025
See application file for complete search history.

(56) References Cited

U.S. PATENT DOCUMENTS

| 5,872,357 | A | 2/1999 | Flanagan |
| 6,660,432 | B2 | 12/2003 | Paulsen et al. |
| 2004/0091780 | A1 | 5/2004 | Kinoshita et al. |
| 2005/0233217 | A1 | 10/2005 | Fujihara et al. |
| 2005/0287442 | A1 | 12/2005 | Kim et al. |
| 2007/0054191 | A1 | 3/2007 | Shirane et al. |
| 2010/0012886 | A1 | 1/2010 | Ryu et al. |
| 2012/0164519 | A1 | 6/2012 | Lee et al. |
| 2012/0208070 | A1 | 8/2012 | Nakashima et al. |
| 2012/0225359 | A1* | 9/2012 | Xu .................. H01G 9/035 429/338 |
| 2012/0258357 | A1 | 10/2012 | Kim |
| 2013/0330609 | A1 | 12/2013 | Sawa et al. |
| 2013/0330610 | A1 | 12/2013 | Shigematsu et al. |
| 2014/0134501 | A1 | 5/2014 | Li et al. |
| 2014/0186722 | A1 | 7/2014 | Lim et al. |
| 2014/0199602 | A1 | 7/2014 | Kim et al. |
| 2015/0249269 | A1 | 9/2015 | Yoon et al. |
| 2016/0156067 | A1* | 6/2016 | Suzuki ............... H01M 10/052 429/328 |

FOREIGN PATENT DOCUMENTS

| CN | 102498590 A | 6/2012 |
| CN | 103928708 A | 7/2014 |
| CN | 104011927 A | 8/2014 |
| JP | 2004342607 A | 12/2004 |
| JP | 2006012806 A | 1/2006 |
| KR | 20020043548 | 6/2002 |
| KR | 20050121172 A | 12/2005 |
| KR | 2006-0116423 A | 11/2006 |
| KR | 20120090755 A | 8/2012 |

(Continued)

OTHER PUBLICATIONS

Han et al ("Lithium Bis(fluorosulfonyl imide (LiFSI) as conducting salt for nonaqueous liquid electrolytes for lithium-ion batteries: Physicochemical and electrochemical properties". Journal of Power Sources vol. 196, Issue 7, Apr. 1, 2011. p. 3623-3632).*
International Search Report from Application No. PCT/KR2015/010133, dated Nov. 25, 2015.
Grunebaum, et al., "Synthesis and electrochemistry of polymer based electrolytes for lithium batteries." Progress in Solid State Chemistry, vol. 42, Isuse 4, Apr. 21, 2014, pp. 85-105.
Sazhin et al., "Characterization of low-flammability electrolytes for lithium-ion batteries." Journal of Power Sources, vol. 196, Issue 7, 2001, pp. 3433-3438.
International Search Report from PCT/KR2015/010243, dated Dec. 23, 2015.

Primary Examiner — Stephen J Yanchuk
(74) Attorney, Agent, or Firm — Lerner, David, Littenberg, Krumholz & Mentlik, LLP

(57) ABSTRACT

Provided are a non-aqueous electrolyte solution, which includes (i) a first lithium salt, (ii) lithium bis(fluorosulfonyl)imide as a second lithium salt, (iii) a phosphazene-based compound as a first additive, and (iv) a non-aqueous organic solvent, and a lithium secondary battery including the non-aqueous electrolyte solution.

With respect to a lithium secondary battery including the non-aqueous electrolyte solution of the present invention, since a robust solid electrolyte interface (SEI) may be formed on the surface of a negative electrode during initial charge and flame retardancy in a high-temperature environment may be provided to prevent the decomposition of the surface of a positive electrode and an oxidation reaction of the electrolyte solution, output characteristics and capacity characteristics after high-temperature storage as well as output characteristics may be improved.

9 Claims, No Drawings

(56) References Cited

FOREIGN PATENT DOCUMENTS

| KR | 20120115839 A | 10/2012 |
|----|---------------|---------|
| KR | 20140036156 A | 3/2014  |
| KR | 20140040285 A | 4/2014  |
| KR | 20140066645 A | 6/2014  |
| KR | 20140082573 A | 7/2014  |

* cited by examiner

NON-AQUEOUS ELECTROLYTE SOLUTION AND LITHIUM SECONDARY BATTERY COMPRISING THE SAME

CROSS-REFERENCE TO RELATED APPLICATIONS

This application claims the benefit of Korean Patent Application Nos. 10-2014-0128884, filed on Sep. 26, 2014, and 10-2015-0135261, filed on Sep. 24, 2015, in the Korean Intellectual Property Office, the disclosure of which is incorporated herein in its entirety by reference.

TECHNICAL FIELD

Technical Field

The present invention relates to a non-aqueous electrolyte solution having output characteristics and capacity characteristics after high-temperature storage, and a lithium secondary battery comprising the non-aqueous electrolyte solution.

Background Art

Demand for secondary batteries as an energy source has been significantly increased as technology development and demand with respect to mobile devices have increased. Among these secondary batteries, lithium secondary batteries having high energy density and high voltage have been commercialized and widely used.

A lithium metal oxide is used as a positive electrode active material of a lithium secondary battery, and a lithium metal, a lithium alloy, crystalline or amorphous carbon, or a carbon composite is used as a negative electrode active material. A current collector may be coated with the active material of appropriate thickness and length or the active material itself may be coated in the form of a film, and the resultant product is then wound or stacked with an insulating separator to prepare an electrode assembly. Thereafter, the electrode assembly is put into a can or a container similar thereto, and a secondary battery is then prepared by injecting an electrolyte solution.

Charge and discharge of the lithium secondary battery is performed while a process of intercalating and deintercalating lithium ions from a lithium metal oxide of a positive electrode into and out of a graphite negative electrode is repeated. In this case, since lithium is highly reactive, lithium reacts with the carbon electrode to form $Li_2CO_3$, LiO, or LiOH. Thus, a film may be formed on the surface of the negative electrode. The film is denoted as "solid electrolyte interface (SEI)", wherein the SEI formed at an initial stage of charging may prevent a reaction of the lithium ions with the carbon negative electrode or other materials during charge and discharge. Also, the SEI may only pass the lithium ions by acting as an ion tunnel. The ion tunnel may prevent the destruction of a structure of the carbon negative electrode due to the co-intercalation of the carbon negative electrode and organic solvents of an electrolyte solution having a high molecular weight which solvates lithium ions and moves therewith.

Therefore, in order to improve high-temperature cycle characteristics and low-temperature output of the lithium secondary battery, a robust SEI must be formed on the negative electrode of the lithium secondary battery. When the SEI is once formed during the first charge, the SEI may prevent the reaction of the lithium ions with the negative electrode or other materials during repeated charge and discharge cycles caused by the subsequent use of the battery, and the SEI may act as an ion tunnel that only passes the lithium ions between the electrolyte solution and the negative electrode.

With respect to a typical electrolyte solution, a non-uniform SEI may be formed because the electrolyte solution does not include an electrolyte solution additive or includes an electrolyte solution additive having poor characteristics, and thus, it may be difficult to expect the improvement of low-temperature output characteristics. Furthermore, when the amount of the added electrolyte solution additive is not adjusted, the surface of a positive electrode may be decomposed or an oxidation reaction of the electrolyte solution may occur during a high-temperature reaction due to the electrolyte solution additive, and eventually, irreversible capacity of the secondary battery may increase and output characteristics may be reduced.

DISCLOSURE OF THE INVENTION

Technical Problem

The present invention provides a non-aqueous electrolyte solution for a lithium secondary battery which may improve high-temperature cycle characteristics and high-temperature storage characteristics as well as low-temperature output characteristics.

The present invention also provides a lithium secondary battery including the non-aqueous electrolyte solution for a lithium secondary battery.

Technical Solution

According to an aspect of the present invention,
there is provided a non-aqueous electrolyte solution comprising:
(i) a first lithium salt;
(ii) lithium bis(fluorosulfonyl)imide (LiFSI) as a second lithium salt;
(iii) a phosphazene-based compound as a first additive; and
(iv) a non-aqueous organic solvent.

According to another aspect of the present invention,
there is provided a lithium secondary battery including: a positive electrode, a negative electrode, a separator disposed between the positive electrode and the negative electrode, and
the non-aqueous electrolyte solution.

Advantageous Effects

Since a secondary battery of the present invention includes a non-aqueous electrolyte solution comprising first and second lithium salts and a phosphazene-based compound, a robust solid electrolyte interface (SEI) may be formed on the surface of a negative electrode during initial charge and flame retardancy in a high-temperature environment may be provided to prevent the decomposition of the surface of a positive electrode and an oxidation reaction of the electrolyte solution. Thus, output characteristics and capacity characteristics after high-temperature storage as well as output characteristics may be improved.

MODE FOR CARRYING OUT THE INVENTION

Hereinafter, the present invention will be described in more detail to allow for a clearer understanding of the present invention. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Specifically, according to an embodiment of the present invention, there is provided a non-aqueous electrolyte solution comprising:

(i) a first lithium salt;
(ii) lithium bis(fluorosulfonyl)imide as a second lithium salt;
(iii) a phosphazene-based compound as a first additive; and
(iv) a non-aqueous organic solvent.

In this case, in the non-aqueous electrolyte solution, the first lithium salt is a lithium salt typically used in a non-aqueous electrolyte solution in the art, and typical examples of the first lithium salt may be any one selected from the group consisting of $LiPF_6$, $LiAsF_6$, $LiCF_3SO_3$, $LiBF_6$, $LiSbF_6$, $LiN(C_2F_5SO_2)_2$, $LiAlO_4$, $LiAlCl_4$, $LiSO_3CF_3$, $LiClO_4$, and a mixture of two or more thereof.

Also, since the non-aqueous electrolyte solution of the present invention further includes the lithium bis(fluorosulfonyl)imide (LiFSI) as the second lithium salt, a robust and thin solid electrolyte interface (SEI) is formed on the surface of a negative electrode. Thus, low-temperature output characteristics may not only be improved but an oxidation reaction of the electrolyte solution may also be prevented by suppressing the decomposition of the surface of a positive electrode which may occur during high-temperature cycles. In this case, since the SEI film formed on the negative electrode is thin, lithium ions in the negative electrode may more smoothly move, and thus, output of a secondary battery may be further improved.

According to an embodiment of the present invention, the first lithium salt and the second lithium salt may be included in a ratio of 1:6 to 1:9. In this case, the ratio denotes a relative ratio, wherein the ratio may denote a molar ratio or a weight ratio, and, for example, may be a molar ratio.

In a case in which the relative ratio of the first lithium salt is 1 or more, since side reactions in the electrolyte solution may excessively occur during charge and discharge of the battery, a swelling phenomenon may occur. In a case in which the relative ratio of the first lithium salt is 1 or less, the output of the prepared secondary battery may be reduced. Specifically, in a case in which the relative ratio of the lithium bis(fluorosulfonyl)imide as the second lithium salt is less than 6, the enormous amount of irreversible reactions may occur during a process of forming the SEI film in the lithium ion battery and a process of intercalating lithium ions, which are solvated by a carbonate-based solvent, into the negative electrode, and effects of improving output characteristics and capacity characteristics after high-temperature storage as well as low-temperature output of the secondary battery may be insignificant due to the exfoliation of a surface layer of the negative electrode (e.g., carbon surface layer) and the decomposition of the electrolyte solution.

Also, the lithium bis(fluorosulfonyl)imide, as the second lithium salt, may be included in a concentration of 0.1 mole/l to 2 mole/l, for example, 0.5 mole/l to 1.5 mole/l based on a total amount of the non-aqueous electrolyte solution. In a case in which the concentration of the lithium bis(fluorosulfonyl)imide is less than 0.1 mole/l, the effects of improving the low-temperature output and high-temperature cycle characteristics of the lithium secondary battery may be insignificant. In a case in which the concentration of the lithium bis(fluorosulfonyl)imide is greater than 2 mole/l, since the side reactions in the electrolyte solution may excessively occur during the charge and discharge of the battery, the swelling phenomenon may occur and corrosion of a positive electrode or negative electrode collector formed of a metal in the electrolyte solution may occur.

Furthermore, the non-aqueous electrolyte solution of the present invention may include a phosphazene-based compound as a first additive.

Specifically, the phosphazene-based compound may include at least one selected from the group consisting of compounds represented by the following Formula 1 and Formula 2.

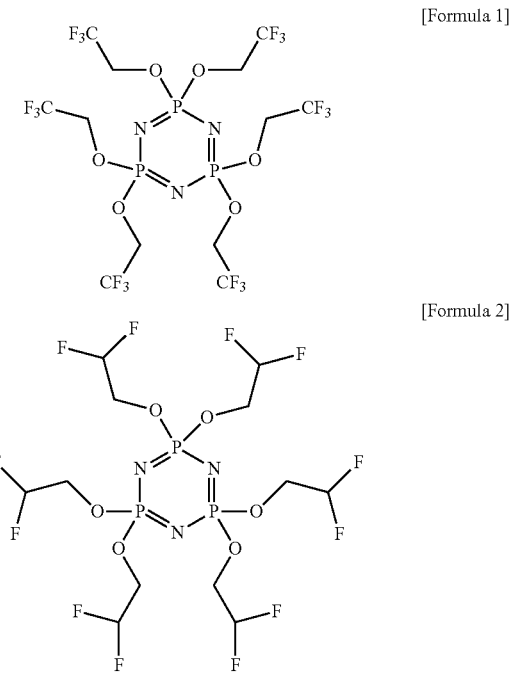

[Formula 1]

[Formula 2]

Typically, in a lithium secondary battery, a so-called "swelling phenomenon" occurs in which oxygen released from a positive electrode in a high-temperature environment promotes an exothermic decomposition reaction of an electrolyte solution solvent to cause the battery to swell, and thus, it may be disadvantageous in that lifetime as well as charge and discharge efficiency of the battery is rapidly reduced and safety of the battery may be significantly reduced, for example, in some cases, the battery explodes. In order to improve the disadvantages, the phosphazene-based compound is further included as a flame-retardant additive in the present invention to suppress gas generated when the electrolyte solution is decomposed by a reaction of the surface of the electrode with the electrolyte solution in a high-temperature environment, and thus, lifetime characteristics of the lithium secondary battery may be improved. Therefore, the lifetime characteristics and high-temperature output characteristics of the lithium secondary battery, which includes the non-aqueous electrolyte solution including the phosphazene-based compound according to the embodiment of the present invention, may be more efficiently improved.

In this case, an amount of the phosphazene-based compound is not particularly limited as long as it is an amount required for attaining the effects of the present invention, such as the improvement of the high-temperature output and lifetime characteristics of the battery, and may be in a range of 0.1 wt % to 15 wt %, for example, 3.0 wt % to 10 wt %, based on a total weight of the non-aqueous electrolyte solution. In a case in which the amount of the phosphazene-based compound is less than 0.1 wt %, a flame-retardant effect may not be sufficiently obtained, and, in a case in which the amount of the phosphazene-based compound is greater than 15 wt %, an increase in the effect is limited, but irreversible capacity may increase or resistance of the negative electrode may increase.

In particular, the amount of the phosphazene-based compound may be adjusted according to the amount of the lithium bis(fluorosulfonyl)imide added as the second lithium salt, and side reactions, which may occur in a case where a large amount of the lithium bis(fluorosulfonyl)imide is added, may be more efficiently prevented by adding the phosphazene-based compound.

Also, the non-aqueous electrolyte solution according to another embodiment of the present invention may further include any one selected from the group consisting of $LiBF_4$, lithium oxalyldifluoroborate (LiODFB), and ethylene sulfate (ESa), as a second additive. For example, the non-aqueous electrolyte solution may include a mixture of two or more selected from the group consisting of $LiBF_4$, LiODFB, and ESa.

The second additive may effectively prevent the corrosion of the current collector due to acidic properties derived from the lithium bis(fluorosulfonyl)imide by forming a stable film on the electrode collector. Also, since the second additive may more effectively suppress limitations which may occur in the case where an excessive amount of the lithium bis(fluorosulfonyl)imide is included, for example, the side reactions in the electrolyte solution during the charge and discharge of the battery at room temperature, the second additive may more effectively improve cycle characteristics. In particular, in relation with the phosphazene-based compound, since the second additives do not cause chemical side reactions due to the addition of the other types of additives, the combination of the second additive is easy.

An amount of the second additive may be in a range of 0.01 wt % to 5 wt % based on the total weight of the electrolyte solution. In this case, when the amount of the second additive further added to the non-aqueous electrolyte solution is excessively large, a side reaction of the second additive remaining in the electrolyte solution may adversely affect capacity and stability characteristics of the battery. Thus, in consideration of such phenomena, a total amount of the second additive, for example, may be in a range of 0.1 wt % to 10 wt % based on the total weight of the electrolyte solution.

Also, the non-aqueous organic solvent, which may be included in the non-aqueous electrolyte solution of the present invention, is not limited as long as it may minimize the decomposition due to the oxidation reaction during the charge and discharge of the battery and may exhibit desired characteristics with the additive. For example, the non-aqueous organic solvent may include a nitrile-based solvent, cyclic carbonate, linear carbonate, ester, ether, or ketone. These materials may be used alone or in combination of two or more thereof.

Among the above organic solvents, carbonate-based organic solvents may be easily used. Examples of the cyclic carbonate may be any one selected from the group consisting of ethylene carbonate (EC), propylene carbonate (PC), butylene carbonate (BC), and a mixture of two or more thereof, and examples of the linear carbonate may be any one selected from the group consisting of dimethyl carbonate (DMC), diethyl carbonate (DEC), dipropyl carbonate (DPC), ethylmethyl carbonate (EMC), methylpropyl carbonate (MPC), ethylpropyl carbonate (EPC), and a mixture of two or more thereof.

The nitrile-based solvent may include at least one selected from the group consisting of acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile, and acetonitrile may be used as the non-aqueous solvent according to the embodiment of the present invention.

Furthermore, according to an embodiment of the present invention, there is provided a lithium secondary battery including a positive electrode, a negative electrode, a separator disposed between the positive electrode and the negative electrode, and the non-aqueous electrolyte solution of the present invention.

In this case, the positive electrode and the negative electrode may be prepared by respectively coating positive electrode and negative electrode collectors with positive electrode and negative electrode active material mixtures.

In this case, the positive electrode active material may include a manganese-based spinel active material, lithium metal oxide, or a mixture thereof. Furthermore, the lithium metal oxide may be selected from the group consisting of lithium-cobalt-based oxide, lithium-manganese-based oxide, lithium-nickel-manganese-based oxide, lithium-manganese-cobalt-based oxide, and lithium-nickel-manganese-cobalt-based oxide, and for example, may include $LiCoO_2$, $LiNiO_2$, $LiMnO_2$, $LiMn_2O_4$, $Li(Ni_aCo_bMn_c)O_2$ (where $0<a<1$, $0<b<1$, $0<c<1$, and $a+b+c=1$), $LiNi_{1-y}Co_yO_2$, $LiCo_{1-y}Mn_yO_2$, $LiNi_{1-y}Mn_yO_2$ (where $0 \leq Y \leq 1$), $Li(Ni_aCo_bMn_c)O_4$ (where $0<a<2$, $0<b<2$, $0<c<2$, and $a+b+c=2$), $LiMn_{2-z}Ni_zO_4$, and $LiMn_{2-z}Co_zO_4$ (where $0<z<2$).

The negative electrode active material may include amorphous carbon or crystalline carbon, and, for example, carbon such as hard carbon and graphite-based carbon; a complex metal oxide such as $Li_xFe_2O_3$ ($0 \leq x \leq 1$), $Li_xWO_2$ ($0 \leq x \leq 1$), $Sn_xMe_{1-x}Me'_yO_z$ (Me: manganese (Mn), iron (Fe), lead (Pb), or germanium (Ge); Me': aluminum (Al), boron (B), phosphorus (P), silicon (Si), Groups I, II and III elements, or halogen; $0<x\leq1$; $1\leq y\leq3$; $1\leq z\leq8$); a lithium metal; a lithium alloy; a silicon-based alloy; a tin-based alloy; a metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; a conductive polymer such as polyacetylene; or a Li—Co—Ni-based material may be used.

Also, as the separator, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination of two or more thereof. In addition, a typical porous nonwoven fabric, for example, a nonwoven fabric formed of high melting point glass fibers or polyethylene terephthalate fibers may be used, but the present invention is not limited thereto.

Hereinafter, the present invention will be described in more detail, according to examples and experimental examples. However, the present invention is not limited thereto.

EXAMPLES

Example 1

[Preparation of Electrolyte Solution]

A non-aqueous electrolyte solution was prepared by adding $LiPF_6$ 0.1 mole/l, as a first lithium salt, and lithium bis(fluorosulfonyl)imide, as a second lithium salt, in a molar ratio of 1:9 and adding 3 wt % of the phosphazene-based compound of Formula 2 as a first additive, based on a total amount of the non-aqueous electrolyte solution to a non-aqueous organic solvent having a composition, in which a volume ratio of ethylene carbonate (EC):ethylmethyl carbonate (EMC) was 3:7.

[Preparation of Lithium Secondary Battery]

A positive electrode mixture slurry was prepared by adding 92 wt % of $LiCoO_2$ as a positive electrode active material, 4 wt % of carbon black as a conductive agent, and 4 wt % of polyvinylidene fluoride (PVdF) as a binder to N-methyl-2-pyrrolidone (NMP) as a solvent. An about 20 μm thick aluminum (Al) thin film as a positive electrode collector was coated with the positive electrode mixture slurry and dried, and the Al thin film was then roll-pressed to prepare a positive electrode.

Also, a negative electrode mixture slurry was prepared by adding 96 wt % of carbon powder as a negative electrode active material, 3 wt % of PVdF as a binder, and 1 wt % of carbon black as a conductive agent to NMP as a solvent. A 10 μm thick copper (Cu) thin film as a negative electrode collector was coated with the negative electrode mixture slurry and dried, and the Cu thin film was then roll-pressed to prepare a negative electrode.

A polymer type battery was prepared by a typical method using a separator formed of three layers of polypropylene/polyethylene/polypropylene (PP/PE/PP) with the positive electrode and negative electrode thus prepared, and a lithium secondary battery was then completed by injecting the prepared non-aqueous electrolyte solution.

Example 2

A non-aqueous electrolyte solution and a lithium secondary battery were prepared in the same manner as in Example 1 except that $LiPF_6$ 0.125 mole/l, as the first lithium salt, and lithium bis(fluorosulfonyl)imide 0.875 mole/l, as the second lithium salt, were used in a molar ratio of 1:7.

Example 3

A non-aqueous electrolyte solution and a lithium secondary battery were prepared in the same manner as in Example 1 except that the compound of Formula 1, instead of the compound of Formula 2, was used as the first additive, and $LiPF_6$ 0.143 mole/l, as the first lithium salt, and lithium bis(fluorosulfonyl)imide 0.857 mole/l, as the second lithium salt, were used in a molar ratio of 1:6.

Example 4

A non-aqueous electrolyte solution and a lithium secondary battery were prepared in the same manner as in Example 1 except that 0.5 wt % of ethylene sulfate (ESa) and 0.5 wt % of $LiPF_4$ were further added as a second additive based on a total weight of the non-aqueous electrolyte solution.

Comparative Example 1

A non-aqueous electrolyte solution and a lithium secondary battery were prepared in the same manner as in Example 1 except that $LiPF_6$ 0.166 mole/l, as the first lithium salt, and lithium bis(fluorosulfonyl)imide (0.834 mole/l), as the second lithium salt, were used in a molar ratio of 1:5.

Comparative Example 2

A non-aqueous electrolyte solution and a lithium secondary battery were prepared in the same manner as in Example 1 except that the first lithium salt was not included and 1.0 mole/l of LiFSI was used alone as the second lithium salt.

Comparative Example 3

A non-aqueous electrolyte solution and a lithium secondary battery were prepared in the same manner as in Example 1 except that the first additive was not included.

Experimental Examples

<Low-Temperature Output Characteristics>

Outputs were calculated from voltage differences which were obtained by charging and discharging the secondary batteries prepared in Examples 1 to 4 and Comparative Examples 1 to 3 at 0.5 C for 10 seconds at −30° C. In this case, the output of Comparative Example 1 was 3.1 W. The outputs of Examples 1 to 4 and Comparative Examples 2 and 3 were calculated as a percentage based on the output of Comparative Example 1. The results thereof are presented in Table 1 below. The experiment was performed at a state of charge (SOC) of 50%.

<Room-Temperature Output Characteristics>

Outputs were calculated from voltage differences which were obtained by charging and discharging the secondary batteries prepared in Examples 1 to 4 and Comparative Examples 1 to 3 at 0.5 C for 10 seconds at 23° C. In this case, the output of Comparative Example 1 was 35.5 W. The outputs of Examples 1 to 4 and Comparative Examples 2 and 3 were calculated as a percentage based on the output of Comparative Example 1. The results thereof are presented in Table 1 below. The experiment was performed at a SOC of 50%.

<Output Characteristics after High-Temperature Storage>

After storing the secondary batteries prepared in Examples 1 to 4 and Comparative Examples 1 to 3 at 60° C. for weeks, outputs were calculated from voltage differences which were obtained by charging and discharging the secondary batteries at 5 C for 10 seconds at 23° C. In this case, the output of Comparative Example 1 was 34.2 W. The outputs of Examples 1 to 4 and Comparative Examples 2 and 3 were calculated as a percentage based on the output of Comparative Example 1. The results thereof are presented in Table 1 below. The experiment was performed at a SOC of 50%.

TABLE 1

| | Output characteristics (%) | | |
|---|---|---|---|
| | Low-temperature output | Room-temperature output | Output after high-temperature storage |
| Example 1 | 4.43 | 3.51 | 10.06 |
| Example 2 | 5.89 | 4.73 | 10.75 |
| Example 3 | 4.35 | 3.61 | 9.38 |
| Example 4 | 5.92 | 3.94 | 11.2 |
| Comparative Example 1 | — | — | — |
| Comparative Example 2 | 1.57 | 1.36 | −3.61 |
| Comparative Example 3 | −2.69 | −1.2 | −4.63 |

As illustrated in Table 1, with respect to the low-temperature and room-temperature outputs, it may be observed that the secondary batteries of Examples 1 to 4 exhibited excellent output values of about 5% in comparison to the secondary batteries of Comparative Examples 1 to 3. In particular, with respect to the secondary batteries of Examples 1 to 4, since stability at high temperature was increased by using the phosphazene-based compound as an additive, the output characteristics after high-temperature storage were increased by a maximum of 15% or more in comparison to the secondary batteries of Comparative Examples 1 to 3.

<Room-Temperature Lifetime Characteristics>

The lithium secondary batteries of Examples 1 to 4 and Comparative Examples 1 to 3 were charged at 1 C to 4.2 V/38 mA at 23° C. under a constant current/constant voltage (CC/CV) condition and then discharged at a constant current (CC) of 3 C to a voltage of 2.5 V to measure discharge capacities. The charge and discharge were repeated 1 to 1,000 cycles, and the discharge capacities, which were measured by calculating capacity in a $1,000^{th}$ cycle as a percentage based on capacity in the $1^{st}$ cycle (capacity in the $1,000^{th}$ cycle/capacity in the $1^{st}$ cycle 100(%)), are presented in Table 2.

<High-Temperature Lifetime Characteristics>

The lithium secondary batteries of Examples 1 to 4 and Comparative Examples 1 to 3 were charged at 1 C to 4.2 V/38 mA at 45° C. under a constant current/constant voltage (CC/CV) condition and then discharged at a constant current (CC) of 3 C to a voltage of 2.5 V to measure discharge capacities. The charge and discharge were repeated 1 to 1,000 cycles, and the discharge capacities, which were measured by calculating capacity in a $1,000^{th}$ cycle as a percentage based on capacity in the $1^{st}$ cycle (capacity in the $1,000^{th}$ cycle/capacity in the $1^{st}$ cycle 100(%)), are presented in Table 2.

TABLE 2

| | Lifetime characteristics (%) | |
|---|---|---|
| | Room-temperature lifetime characteristics | High-temperature lifetime characteristics |
| Example 1 | 83.5 | 77.4 |
| Example 2 | 85.3 | 80.7 |
| Example 3 | 83.1 | 76.9 |
| Example 4 | 85.9 | 89.6 |
| Comparative Example 1 | 76.4 | 70.4 |
| Comparative Example 2 | 59.8 | 54.8 |
| Comparative Example 3 | 71.5 | 66.3 |

As illustrated in Table 2, it may be confirmed that the room-temperature and high-temperature lifetime characteristics of the lithium secondary batteries of Examples 1 to 4 were better than those of the lithium secondary batteries of Comparative Examples 1 to 3. In particular, with respect to Example 4 in which the phosphazene-based compound, as the first additive, and ESa and $LiBF_4$, as the second additive, were mixed and added, it may be confirmed that the high-temperature lifetime characteristics were more efficiently increased than the secondary batteries of the comparative examples. Furthermore, with respect to Comparative Example 2 in which the first lithium salt was not included and lithium bis(fluorosulfonyl)imide, as the second lithium salt, was only included, it may be understood that the high-temperature lifetime characteristics were significantly reduced.

The invention claimed is:

1. A non-aqueous electrolyte solution comprising:
   (i) a first lithium salt;
   (ii) lithium bis(fluorosulfonyl)imide as a second lithium salt;
   (iii) a phosphazene-based compound as a first additive; and
   (iv) a non-aqueous organic solvent,
   wherein the first lithium salt comprises any one selected from the group consisting of $LiPF_6$, $LiAsF_6$, $LiCF_3SO_3$, $LiN(CF_3SO_2)_2$, $LiBF_6$, $LiSbF_6$, $LiN(C_2F_5SO_2)_2$, $LiAlO_4$, $LiAlCl_4$, $Li_3O_3CF_3$, $LiClO_4$, and a mixture of two or more thereof, and
   a mixing ratio of the first lithium salt to the lithium bis(fluorosulfonyl)imide, as the second lithium salt, is in a range of 1:6 to 1:9 as a molar ratio;
   wherein the phosphazene-based compound comprises at least one selected from the group consisting of compounds represented by Formula 1 and Formula 2,

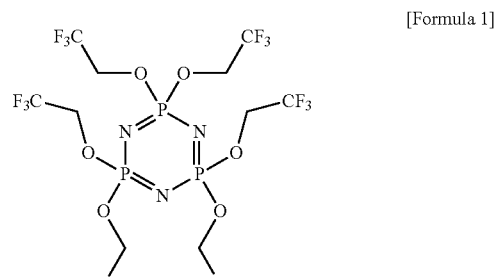

[Formula 1]

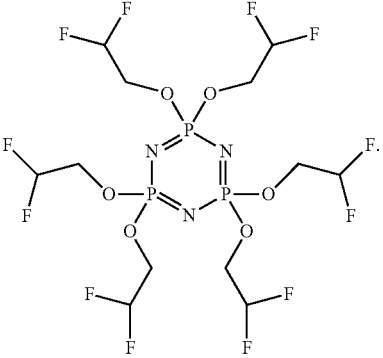

[Formula 2]

2. The non-aqueous electrolyte solution of claim 1, wherein the lithium bis(fluorosulfonyl)imide, as the second lithium salt, is included in a concentration of 0.1 mole/l to 2 mole/l based on a total amount of the non-aqueous electrolyte solution.

3. The non-aqueous electrolyte solution of claim 1, wherein the phosphazene-based compound is included in an amount of 0.1 wt % to 15 wt % based on a total weight of the non-aqueous electrolyte solution.

4. The non-aqueous electrolyte solution of claim 1, further comprising any one selected from the group consisting of LiBF$_4$, lithium oxalyldifluoroborate, ethylene sulfate, and a mixture of two or more thereof, as a second additive.

5. The non-aqueous electrolyte solution of claim 4, wherein the second additive is included in an amount of 0.1 wt % to 10 wt % based on a total weight of the non-aqueous electrolyte solution.

6. The non-aqueous electrolyte solution of claim 1, wherein the non-aqueous organic solvent comprises any one selected from the group consisting of a nitrile-based solvent, linear carbonate, cyclic carbonate, ester, ether, ketone, and a mixture of two or more thereof.

7. The non-aqueous electrolyte solution of claim 6, wherein the cyclic carbonate comprises one selected from the group consisting of ethylene carbonate (EC), propylene carbonate (PC), butylene carbonate (BC), and a mixture of two or more thereof, and the linear carbonate comprises any one selected from the group consisting of dimethyl carbonate (DMC), diethyl carbonate (DEC), dipropyl carbonate (DPC), ethylmethyl carbonate (EMC), methylpropyl carbonate (MPC), ethylpropyl carbonate (EPC), and a mixture of two or more thereof.

8. The non-aqueous electrolyte solution of claim 6, wherein the nitrile-based solvent comprises any one selected from the group consisting of acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, 4-fluorophenylacetonitrile, and a mixture of two or more thereof.

9. A lithium secondary battery comprising:

a positive electrode;

a negative electrode;

a separator disposed between the positive electrode and the negative electrode; and the non-aqueous electrolyte solution of claim 1.

* * * * *